(12) United States Patent
Teerlink

(10) Patent No.: US 10,907,701 B2
(45) Date of Patent: Feb. 2, 2021

(54) FLYWHEEL SYSTEM

(71) Applicant: S4 Energy B.V., Rotterdam (NL)

(72) Inventor: Peter Teerlink, Rotterdam (NL)

(73) Assignee: S4 Energy B.V., Rotterdam (NL)

( * ) Notice: Subject to any disclaimer, the term of this patent is extended or adjusted under 35 U.S.C. 154(b) by 193 days.

(21) Appl. No.: 15/125,091

(22) PCT Filed: Apr. 7, 2015

(86) PCT No.: PCT/NL2015/050221
§ 371 (c)(1),
(2) Date: Sep. 9, 2016

(87) PCT Pub. No.: WO2015/156667
PCT Pub. Date: Oct. 15, 2015

(65) Prior Publication Data
US 2017/0037932 A1    Feb. 9, 2017

(30) Foreign Application Priority Data

Apr. 7, 2014 (NL) ...................... 2012577

(51) Int. Cl.
*F16F 15/315* (2006.01)
*H02K 7/02* (2006.01)
(Continued)

(52) U.S. Cl.
CPC .......... *F16F 15/315* (2013.01); *H02K 7/025* (2013.01); *H02K 11/21* (2016.01); *H02K 11/30* (2016.01); *H02K 2213/03* (2013.01); *Y02E 60/16* (2013.01)

(58) Field of Classification Search
CPC .... F16F 15/305; F16F 15/315; F16F 15/3153; F16F 15/28; F16F 2230/26; H02K 7/025;
(Continued)

(56) References Cited

U.S. PATENT DOCUMENTS 4,075,542 A    2/1978 Szegedy
4,385,845 A *  5/1983 Hoshino .............. F16C 17/08
                                                   384/123
(Continued)

FOREIGN PATENT DOCUMENTS

JP    S58123346    7/1983
JP    58-186766    12/1983
(Continued)

OTHER PUBLICATIONS

Matsukawa, A 215 MVA Flywheel Motor-Generator with 4 GJ Discharge Energy for JT-60 Toroidal Field Coil Power Supply System,1987, IEEE Transactions on Energy Conversion, v. 4.

*Primary Examiner* — Daniel D Yabut
(74) *Attorney, Agent, or Firm* — Marcus C. Dawes

(57) ABSTRACT

The present disclosure relates to a flywheel system. The flywheel system comprises a rotation axis and a flywheel rotor connected to the rotation axis. Further, the system comprises a drive and/or a power generator connected to the flywheel rotor. According to the invention, the flywheel rotor has an outer radius in radial direction of at least 0.85 meter, preferably at least meter, and more preferably at least 1.30 meter. The invention further relates to flywheel rotors having a thickness in axial direction of at least 0.30 meter, preferably at least 0.45 meter, and more preferably at least 0.60 meter. Finally, the invention also relates to a flywheel system of which the rotor has a weight of at least 2.5 tons, preferably at least 4 tons and more preferably at least 5 tons.

12 Claims, 9 Drawing Sheets

(51) Int. Cl.
*H02K 11/21* (2016.01)
*H02K 11/30* (2016.01)

(58) Field of Classification Search
CPC .. H02K 7/02; H02K 7/18; Y02E 60/16; F03G 3/08; Y10T 74/2117; Y10T 74/2119; Y10T 74/212; Y10T 74/2122; Y10T 74/2125; Y10T 74/2132
See application file for complete search history.

(56) References Cited

U.S. PATENT DOCUMENTS

| | | | | |
|---|---|---|---|---|
| 4,821,599 | A * | 4/1989 | Medlicott | F16F 15/30 74/572.11 |
| 4,860,611 | A * | 8/1989 | Flanagan | F16C 15/00 74/572.12 |
| 5,767,595 | A | 6/1998 | Rosen | |
| 5,864,303 | A | 1/1999 | Rosen | |
| 6,817,266 | B1 * | 11/2004 | Brackett | F16F 15/315 403/360 |
| 7,034,420 | B2 * | 4/2006 | Brackett | H02K 7/025 310/74 |
| 2003/0192449 | A1 | 10/2003 | Fiske | |
| 2004/0069092 | A1 * | 4/2004 | Schankin | F16F 15/005 464/180 |
| 2005/0040776 | A1 * | 2/2005 | Sibley | F16F 15/3153 318/150 |
| 2008/0168858 | A1 * | 7/2008 | Bakholdin | F16F 15/3153 74/572.11 |
| 2011/0140455 | A1 | 6/2011 | Wiggins | |
| 2011/0214528 | A1 * | 9/2011 | Foley | F16F 15/315 74/572.21 |
| 2014/0366683 | A1 * | 12/2014 | Pullen | F16F 15/30 74/572.11 |
| 2015/0047458 | A1 * | 2/2015 | Cavaliere | B29C 70/28 74/572.21 |

FOREIGN PATENT DOCUMENTS

| | | |
|---|---|---|
| JP | 60-55265 | 4/1985 |
| JP | 9-506310 | 6/1997 |
| JP | 2004-072980 | 4/2004 |
| JP | 2005-503097 | 1/2005 |
| JP | 2012-500617 | 1/2012 |
| JP | 2012-518144 | 8/2012 |
| WO | WO-03017449 | 2/2003 |
| WO | WO-2012121602 | 9/2012 |
| WO | WO-2013182762 | 12/2013 |

* cited by examiner

FLYWHEEL SYSTEM

RELATED APPLICATIONS

The present application is a 371 national phase application of international application serial no. PCT/NL2015/050221, filed on Apr. 7, 2015, which in turn was related to Netherlands Application, serial no. 2012577, filed on Apr. 7, 2014, which are incorporated herein by reference and to which priority is claimed pursuant to 35 USC 119.

GOVERNMENT RIGHTS

Not applicable.

THE NAMES OF THE PARTIES TO A JOINT RESEARCH AGREEMENT

Not applicable.

INCORPORATION-BY-REFERENCE OF MATERIAL SUBMITTED ON A CD OR AS A TEXT FILE

Not applicable.

STATEMENT REGARDING PRIOR DISCLOSURES BY THE INVENTOR OR A JOINT INVENTOR

Not applicable.

Background

Field of the Technology

The present disclosure relates to a flywheel system.

Description of the Prior Art

Many flywheel systems are commonly known to comprise at least a flywheel and the drive/generator configuration. For common applications, for instance to save energy in vehicles and the like, there has been a tendency in this field of technology towards providing increasingly compact and smaller flywheel systems.

Notwithstanding this tendency in that field of technology, efficient ways of storing energy during prolonged periods of time are desired, more in particular for stationery configurations. In this technical field, which is considered the more relevant technical field for the present disclosure, the potential of flywheel systems has been entirely overlooked.

BRIEF SUMMARY

The present disclosure aims at providing an efficient system for storage of energy during prolonged periods of time, in particular in a mechanical manner, based on a flywheel of suitable dimensions for the envisaged high-capacity and high energy storage of energy.

It is acknowledged here that US-2003/192449 discloses a big ring-shaped flywheel, with a spoke construction of which spokes form connection elements between the rotation axis and the ring-shaped flywheel. US-2011/120455 discloses a disk shaped flywheel, which abuts immediately onto the rotation axis, and WO-03/017449 discloses a flywheel configured from a multitude of plates, each rotatably connected to a hub, with an upper and lower wall enclosing a space for the plates and having a wing-profile to generate lift.

Embodiments of the present disclosure provide a flywheel system, comprising: a rotation axis; a ring shaped flywheel rotor; at least one connection element connecting the ring shaped flywheel rotor to the rotation axis; a drive and/or a power generator connected to the flywheel rotor; wherein the flywheel rotor has an outer radius in radial direction of at least 0.85 meter, preferably at least 1 meter, and more preferably at least 1.30 meter, a thickness in axial direction of at least 0.30 meter, preferably at least 0.45 meter, and more preferably at least 0.60 meter, and a weight of at least 2.5 tons, preferably at least 4 tons and more preferably at least 5 tons. Said thickness could relate—in specific embodiments—to length of the axis in an upright or lying orientation, or in other embodiments more literally a thickness of the flywheel rotor in the direction in which the rotation axis extends. Such dimensions are merely exemplary of the relatively enormous size of the flywheel in particular and the flywheel system as well, from which the correlated increased amounts of energy, that can be stored therein, become abundantly clear. Such dimensions in terms of size and weight strongly contrast tendencies in the relevant technical field towards miniaturization. Notwithstanding, a considerable efficiency can be achieved thereby, and a system having a high efficiency can unexpectedly be obtained.

According to the present disclosure and in addition to the above discussed prior art: the at least one connection element is disk shaped, and arranged on or against a first axial end of the ring shaped flywheel rotor to connect the ring-shaped flywheel and the rotation axis, wherein the disk-shaped connection element is connected to the rotation axis via a shrink-fit connection.

Embodiments of the present disclosure exhibit distinct advantages and inventive effects with respect to the large amounts of energy that can be stored therein. Such fundamentally larger dimensions of flywheels allow for associated higher amounts of energy that can be stored therein, until effective use thereof is desired.

In a particular embodiment, the flywheel system is such that the flywheel rotor may be ring shaped and may have an inner radius in radial direction of at least 0.75 meter, preferable at least 1 meter, and more preferably at least 1.10 meter.

For instance, the flywheel system having a suitable combination of the dimensions as mentioned above can be such, that the drive and/or the power generator is, in use of the flywheel system, arranged to allow rotation of the flywheel at a speed of between at least 600 rpm and 1800 rpm, preferably more than 1000 rpm or at least 1400 rpm, and more preferably at most approximately 1800 rpm. More in particular it should be noted that with such dimensions in combination with mentioned rotational speeds, not necessarily in combination with air elevation, and efficiency can be attained where losses can be limited to for instance at most 7.5% per hour. This is to say that the system may exhibit a very low loss of less than 7.5% of the amount of energy that is input into the flywheel, per hour. Any skilled reader will acknowledge that such results are at least surprising, and indicative of the benefits and/or inventive effects of such embodiments of the present disclosure.

As indicated above, the flywheel system exhibits the features that the flywheel rotor is ring shaped. In a non-limiting embodiment based on air levitation, the flywheel rotor may comprise as a closing element a disk-shaped element connecting a high-mass ring on the outer perimeter and the rotation axis at the centre. Said features contribute to improving air elevation, in particular for flyweels of increased dimensions relative to known flywheels. Furthermore, the disk-shaped element distributes acting tensions caused by centrifugal forces evenly over the entire axis and/or hub.

Also in embodiments that are not based on air levitation, can the closing element exhibit benefits and/or inventive effects in that the high mass flywheel rotor may be rotated around the rotation axis at very high rotational speeds, where the outer periphery of the flywheel rotor may move at absolute speeds approximating the speed of sound. By the use of a closing element or even more in particular a disk-shaped element a sturdy connection can be provided between the flywheel rotor and the rotation axis, which may be designed to evenly in all radial directions withstand the tension and/or pulling forces generated by the flywheel ring and the centrifugal forces acting on the closing or even disk-shaped element.

It is noted here that embodiments of the present disclosure are based on air levitation, and others are not. For example, embodiments could be considered to have atmospheric pressure somewhere around the flywheel, but this is considered to be less attractive because of the air drag that would then be exerted on the flywheel. Consequently, embodiments with air levitation are preferably (but not exclusively) based on creating an air cushion at the flywheel, preferably underneath the flywheel, with a higher pressure than other volumes surrounding the flywheel, but still at a considerably decreased pressure relative to atmospheric. In embodiments that are not based on air levitation, the entire surrounding volume at the flywheel is preferably at a considerably reduced pressure without any compartment to allow for air levitation, but preferably homogenously as vacuum as possible.

Further, the flywheel system may exhibit the alternative or additional features that the closing or connecting element supporting the ring shaped flywheel is flexible enough to withstand the centrifugal forces, without exhibiting permanent deformation. Depending on a particular embodiment of the closing or connecting element, bending may prove unavoidable. However, with this particular feature, bending of the connecting element and the flywheel as a whole can be accommodated for in a reliable manner.

Also stretch or pulling on the closing or connecting element could lead to a controllable degree of radial extension, again without permanent deformation occurring.

In an embodiment of the present disclosure, the flywheel system having a ring shaped flywheel rotor may exhibit the features, that at least one connection element is arranged between a first axial end of the ring shaped flywheel rotor and the rotation axis. Additionally or alternatively, at least one additional connection element may be arranged between an axially opposing axial end of the flywheel rotor and the rotation axis. Such a connection element or additional connection element can effectively reduce radial load, deformation and expansion, as well as lateral forces on or of the ring shaped flywheel rotor. Such connection elements can in specific embodiments—not further elaborated on herein—be formed by disk shaped cover elements, wheel spokes or a disk at an axially central position relative to the thickness of the ring shaped flywheel rotor. However, additionally or alternatively, the flywheel system according to the present disclosure may be such that at least one of the connection element and the additional connection element is disk shaped, and preferably arranged on or against axial ends of the ring shaped flywheel rotor. In embodiments with air levitation, to which the present disclosure is not limited, such disk shaped connection elements can compare with the aforementioned closing elements, and serve to close of an interior space of the ring shaped flywheel rotor, in order to enhance the vacuum or pressure difference necessary for air lift or levitation of the heavy flywheel rotor. Further, even outside of the context of any air levitation, disk shaped connection elements can be fixed to the ring shaped flywheel rotor uniformly around the circumference thereof to yield a very robust and reliable connection and assembly, capable of reducing or even eliminating expansion and/or deformation of the disk shaped flywheel rotor and/or lateral force acting thereon, even at very high velocities, which in some embodiments may approach the speed of sound, e.g. 1800 rpm at an outer circumference corresponding with a radius of for example 1.3 meter, and at all radial positions around the aforementioned outer circumference of the flywheel rotor.

As indicated above the disk shaped connection or closing element may be flexible to support the ring shaped flywheel rotor. In particular in an embodiment of the present disclosure having axially opposing disk shaped connecting elements, rigidity of the resulting assembly is enhanced by said duplication of the axially opposing disk shaped connection elements.

In an embodiment having the disk shaped connection element or additional connection element, the connection element may be thicker at the rotation axis than at the ring shaped flywheel rotor. Said thickness is in an axial direction. Such thickness related features can provide a desired degree of flexibility. Apart therefrom, the stiffness of the disk shaped connection element and/or additional connection element depends on the thickness thereof. The relevant feature of a decrease in thickness in radial direction from the rotation axis (or a hub) allows for creating an optimal distribution of load, tension, forces, expansion and deformation between the ring shaped flywheel rotor and the one or two disk shaped connection elements. This results in a constant load of the assembly of the ring shaped flywheel rotor and the one or two disk shaped connection elements, without abrupt load changes, whereby fatigue related phenomena can essentially be avoided or eliminated. For example the thickness of the one or two disk shaped connection element at the rotation axis is more than 13 mm, preferably more than 16 mm and more preferably more than 18 mm and most preferably approximately 20 mm. Further, as an example, the thickness at the ring shaped flywheel rotor is less than 19 mm, preferably less than 17 mm and more preferably less than 15 mm and most preferably approximately 12 mm. These dimensions correspond to a large degree with the specific embodiment, described below, and/or the configuration as defined and described above in relation to radii, thickness and ring shape of the flywheel rotor, but could be adapted to any alternative configuration. Alternatively any other feature with respect to either the connection element(s) and/or the ring shaped flywheel rotor or other form of rotor may contribute to a desired degree of deformability to allow for expansion of the ring resulting from high centrifugal forces at high rotational speeds.

Embodiments of the present disclosure having at least one, preferably disk shaped connection element can alternatively or in addition to above discussed features be such, that a hub is arranged on or forms part of the rotation axis, to which at least one connection element is connected and extends from the hub to the ring-shaped flywheel rotor. A hub may provide the most reliable and rotation symmetric attachment of the at least one connection element to the rotation axis. Said embodiment may be such, that the at least one connection element is connected to the hub via a shrink-fit connection. Additionally or alternatively, the at least one connection element is pre-stressed in a connection with the hub. Excessive radial tensions and forces may occur, if the at least one of the connection element and the additional connection element is extremely rigid. Likewise, if attachment of the at least one of the connection element and the additional connection element is extremely rigid, this results in excessive radial forces and stress or tension, in the ring shaped flywheel rotor and/or the connection element(s). However, a overly flexible connection or attachment at the hub could result in instability during rotation, where the slightest imbalance can result in extreme amplifying excentric rotation of the flywheel rotor, accompanied by tremendous radial forces, in particular if the connection element(s) come(s) loose from the hub. The shrink-fit connection and/or pre-stressing of the at least one connection element can effectively be employed to avoid or even eliminate such problems. The disk shaped connection element can expand, mainly though not exclusively as a consequence of the shrink-fit connection without welding or bolts and/or other conventional stress generating possibilities, whilst any expansion of the at least one, preferably disk shaped connection element does not result in any play or freedom of movement relative to the hub, mainly though not exclusively as a consequence of pre-stress in or of the disk shaped connection element and/or the additional disk shaped connection element. Confronted with the effects of pre-stressing a connection between the hub and the connection element(s) it is self-evident that any properly engineered alternative configuration for the pre-stressing feature may result in achieving the same effects. For example, spring elements may be evenly distributed around the circumference of the hub between the hub and an inner rim of a central hole in the sometimes disk-shaped connection element(s), to compensate for any increase in diameter of the connection element(s) and more in particular the diameter of the central passage therein for accommodating the hub. Yet further alternatives are also possible within the context of the present disclosure and/or invention.

Further, the flywheel system may exhibit the alternative or additional features of an air ring comprising concentric ring elements, and the air discharge comprises at least one air evacuation connection between each pair of neighbouring concentric ring elements in connection with an air evacuator, such as a pump. As a consequence, separate air evacuation stages are created, whereby optimal circumstances can be generated for air elevating the flywheel on an air cushion in a space defined by the air ring. In such an embodiment, a further feature may be provided that a filling is arranged between the concentric ring elements, except on at least one location associated with the at least one air evacuation connection, where the filling elements may exhibit a curvature of the upper edge thereof, downward towards evacuation connections and a upwards towards an upper region of the concentric ring elements. Thereby, a size of a space from which air is to be evacuated from within the concentric ring elements can be minimised.

Further, the flywheel system may exhibit the alternative or additional features that the air ring or at least one of the concentric ring elements comprises a top section, defining at least two protrusions extending towards the flywheel, and an intermediate depression between the protrusions in a position set back from the flywheel, relative to the protrusions. As a consequence, air pockets can be created to enhance air elevation of the flywheel on or over the air ring, or on or over the concentric ring elements Further, the flywheel system may exhibit the alternative or additional features that the air ring is mounted on an elevator configuration, arranged to lower the air ring with the flywheel in rest, raise the air ring during start up of the flywheel, and to elevate the air ring in a fully operational state of the flywheel system with the flywheel rotating at an operational rotation speed. Thereby, bending of the flywheel can be accommodated for, whilst presenting the flywheel from frictionally engaging the air ring, in particular during initialisation of rotational movement of the flywheel. In such an embodiment a further feature can be provided that the elevator configuration is arranged to closely approximate the flywheel at least during start up and operational state, for example to a distance of approximately 50 µm, without contacting the flywheel. With an air gap between the inner ring and the flywheel, an effective air elevation of even the heaviest flywheels can be achieved, although other dimensions may likewise prove effective, depending on the parameters, for instance, of the flywheel itself.

Further, the flywheel system may exhibit the alternative or additional features of a housing accommodating at least the air ring and the overlying flywheel, where housing comprises at least one air evacuation connection in connection with an air evacuator, such as a pump, to maintain an underpressure in the interior of the housing relative to an interior of a space defined by the air ring and the flywheel.

Further, the flywheel system may exhibit the alternative or additional features of a control associated with the drive and/or power generator, and at least one sensor, such as a vibration sensor, arranged to adjust a rotational speed of the flywheel when the sensor detects instabilities in an operational state, such as vibrations. Although any skilled reader will immediately realise that all due effort needs to be invested when designing such are flywheel system in avoiding that eigen-frequencies can occur. However, this particular set of features enables monitoring of the flywheel device and prevent excessive oscillations in vibrations by detecting the vibrations and altering a rotational speed of the flywheel to allow the system to leave such a potentially dangerous state.

After the foregoing general indication of aspects of embodiments of the present disclosure, herein below a specific embodiment of a flywheel system according to the present invention will be described, by way of example only, to which scope of protection according to the appended claims is not to be limited.

DETAILED DESCRIPTION OF THE PREFERRED EMBODIMENTS

Figure 1:
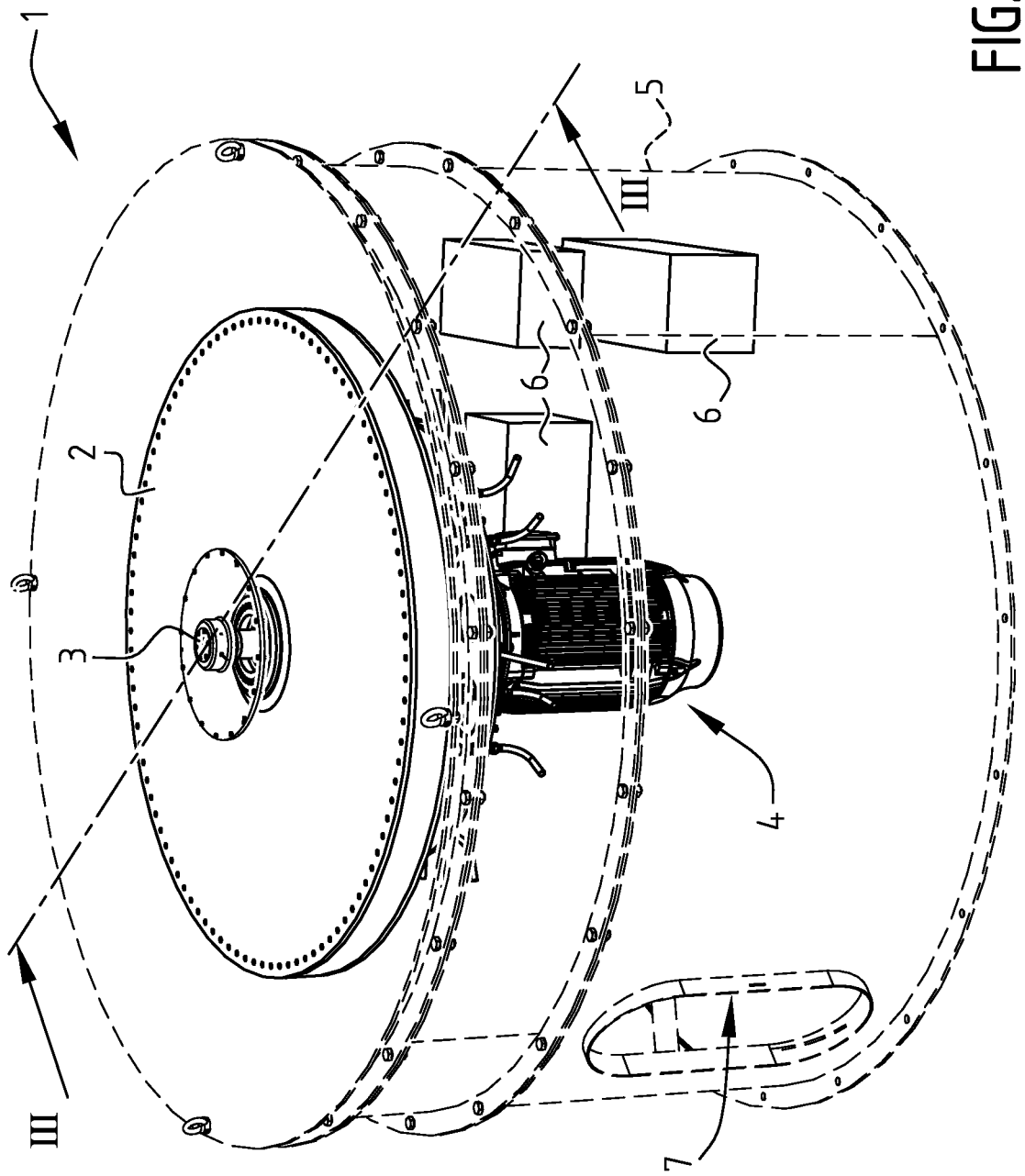
FIG. 1 is a partial cross-sectional perspective view of the flywheel system of the current invention.

In FIG. 1, a flywheel system 1 is shown, comprising a flywheel rotor 2, which is arranged on a drive shaft 3, and a drive and/or electric power generator 4. The drive and/or electric power generator 4 can comprise a motor to drive the flywheel rotor 2 in a rotational movement around an upright axis, defined by the drive shaft 3, and/or can be used to create or generate electrical energy or power from rotational movement of the flywheel rotor 2. The rotor 2 could be arranged upright, to be rotatable around a lying horizontal rotation axis.

The assembly of flywheel rotor 2 and drive/generator 4 is accommodated in a housing 5, in which also a number of air evacuators in the form of pumps 6 are provided to provide air levitation (which is optional in the present disclosure). In contrast with prior art systems containing a flywheel rotor, the present embodiment is relatively very large. In fact, the flywheel system in the present embodiment is sufficiently large for the housing to contain an access 7, to allow maintenance personnel and the like to enter into housing 5.

Figure 4:
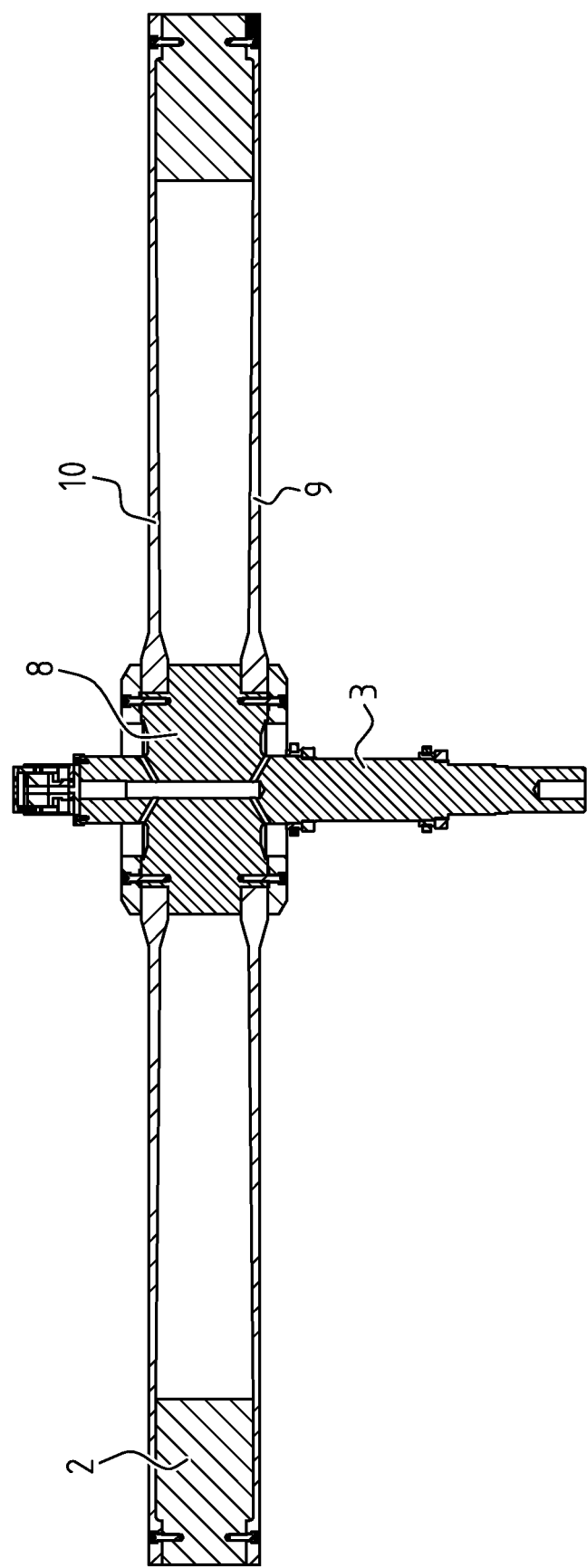
FIG. 4 is a magnified cross-sectional view of the hub of the flywheel system seen in FIG. 1.

As shown in FIG. 4, the actual flywheel rotor 2 is ring shaped. A hub 8 of the flywheel system 1 in FIG. 1 is connected with drive shaft 3 forming a rotation axis and with the actual flywheel rotor 2 via a lower, disc shaped cover element 9 forming a connection element between the hub 8 and the ring shaped flywheel rotor 2, and an upper, disc shaped cover element 10 forming an additional connection element between the hub 8 and the ring shaped flywheel rotor 2. Preferably, the cover elements 9, 10 impart a considerable stiffness to the assembly, shown in FIG. 4, of the drive shaft 3, rotor 8 and cover elements 9, 10. However, at the specific weight of the actual flywheel 2, bending of the cover elements 9, 10 may turn out to be unavoidable, and for such eventualities a material for or of the cover elements 9, 10 may expressly be chosen to be as stiff and rigid as possible, but simultaneously also be flexible to a necessary degree, in order to ensure flexing as a consequence of the considerable weight of flywheel rotor 2. Further, flexing or expanding of the cover elements 9, 10 should be enabled to compensate for the tremendous tensions and centrifugal forces exerted on the cover elements 9, 10, at the high velocities at which the flywheel rotor 2 rotates and is or may be prone to expand. In particular, thickness of the cover elements 9 and 10 may vary in radial direction, at the rotation axis being more than 13 mm, preferably more than 16 mm and more preferably more than 18 mm and most preferably approximately or more than 20 mm. At the ring shaped flywheel rotor 2 the thickness may be less than 19 mm, preferably less than 17 mm and more preferably less than 15 mm and most preferably approximately 12 mm. With such variations in the thickness, which are only exemplary, expansion of the flywheel rotor 2 at high velocities may be absorbed by the cover elements 9, 10, which may stretch (but not deform) as a consequence.

The drive shaft 3 and the cover elements 9, 10 may be connected using a shrink-fit connection, in addition to or as an alternative for the shown mechanical connections like welds, screws or bolts (in FIG. 4 bolts are depicted). For instance, the hub 8 can be cooled to a temperature of −170.degree. C., whilst the cover elements 9, 10 can be heated to a temperature of 200.degree. C., to allow the drive shaft and the cover elements to fuse or shrink-fit together after assembly, when relative temperature differences between hub 8 and cover elements 9, 10 diminish. Prior to said assembly, the hub may be over-dimensioned by between 0.6 and 1.2 mm, more preferably between 0.8 and 1.0 mm, to allow for expansion of the cover elements 9, 10 of for example 0.35 mm at a rotational speed of 1800 rpm, of the flywheel rotor 2. Alternatively, cover elements 9, 10 may be shrink-fitted onto the drive shaft 3 without hub 8 there between. As a requirement for achieving such a connection of cover elements 9, 10 and hub 8 or drive shaft 3, dimensions thereof should correspond very closely in a state with maximum temperature differences, when the hub 8 or axis 3 is cooled and elements 9, 10 are heated. When temperature differences diminish, hub 8 or shaft 3 will tend to expand when warming up to for instance room temperatures, whilst cover elements 9, 10 will tend to shrink-fit when cooling down. In conjunction, a highly reliable connection can be established.

The drive shaft 3 extends to or into the drive/generator 4, to allow flywheel rotor 2 to be driven in a rotational movement, or to derive electrical power or energy from such an ongoing rotational movement.

As indicated above, the flywheel system is relatively large. More in particular, the flywheel system may be such, that flywheel rotor 2 has an inner radius in radial direction of at least 0.75 meter, preferable at least 1 meter, and more preferably at least 1.10 meter. Further, the flywheel system may be such that the flywheel rotor 2 has an outer radius in radial direction of at least 0.85 meter, preferable at least 1 meter, and more preferably at least 1.30 meter. Yet further, the flywheel system 1 may be such, that the flywheel rotor 2 has a thickness in axial direction of at least 0.30 meter, preferable at least 0.45 meter, and more preferably at least 0.60 meter. In specific embodiments, the ring shaped flywheel rotor 2 can in fact be made from any material, preferably having a relatively high mass density, such as metal. In the disclosed embodiments, this material could be steel, and could even be weighted with lead or the like. In particular, the flywheel system 1 could be such that the flywheel rotor 2 has a weight of at least 2.5 tons, preferably at least 4 tons and more preferably at least 5 tons. In the embodiments according to the appended drawing, such a flywheel to may develop a rotational speed of up to or over 1800 rpm, wherein weight of the flywheel is approximately 5 ton. Very surprisingly, such a very large and heavy flywheel rotor 2 can be operated at a loss of 7.5%, or even less. Such an efficiency is entirely unexpected in view of the prior art developments, which are mainly in the direction of making flywheel systems more compact, yielding such flywheel systems with relatively small flywheels. However, naturally, the present disclosure and the scope of protection according to the appended claims are not the limited to any such parameters in use, and a flywheel in an alternative embodiment could even be operated at a lower rotational speed, for instance speed of 600 rpm or at least 1000 rpm, preferably at least 1400 rpm, or an even higher rotational speed. To ensure that the flywheel rotor 2 will stay connected to the axis 3 or hub 8 via the cover elements 9, 10, the rotational speed should be limited or restricted, for which a control system may be employed. For the purpose of illustration it is noted here that the periphery of the rotor 2 in an embodiment having a radius of 1.3 meter, at the outer radius thereof, when rotating at a speed of for example 1800 rpm, approximates or exceeds the speed of sound. Should an increase in speed still be desired relative thereto, then further measures to ensure a proper and robust connection at the hub 8 or rotation axis 3 needs to be contemplated.

Figure 2:
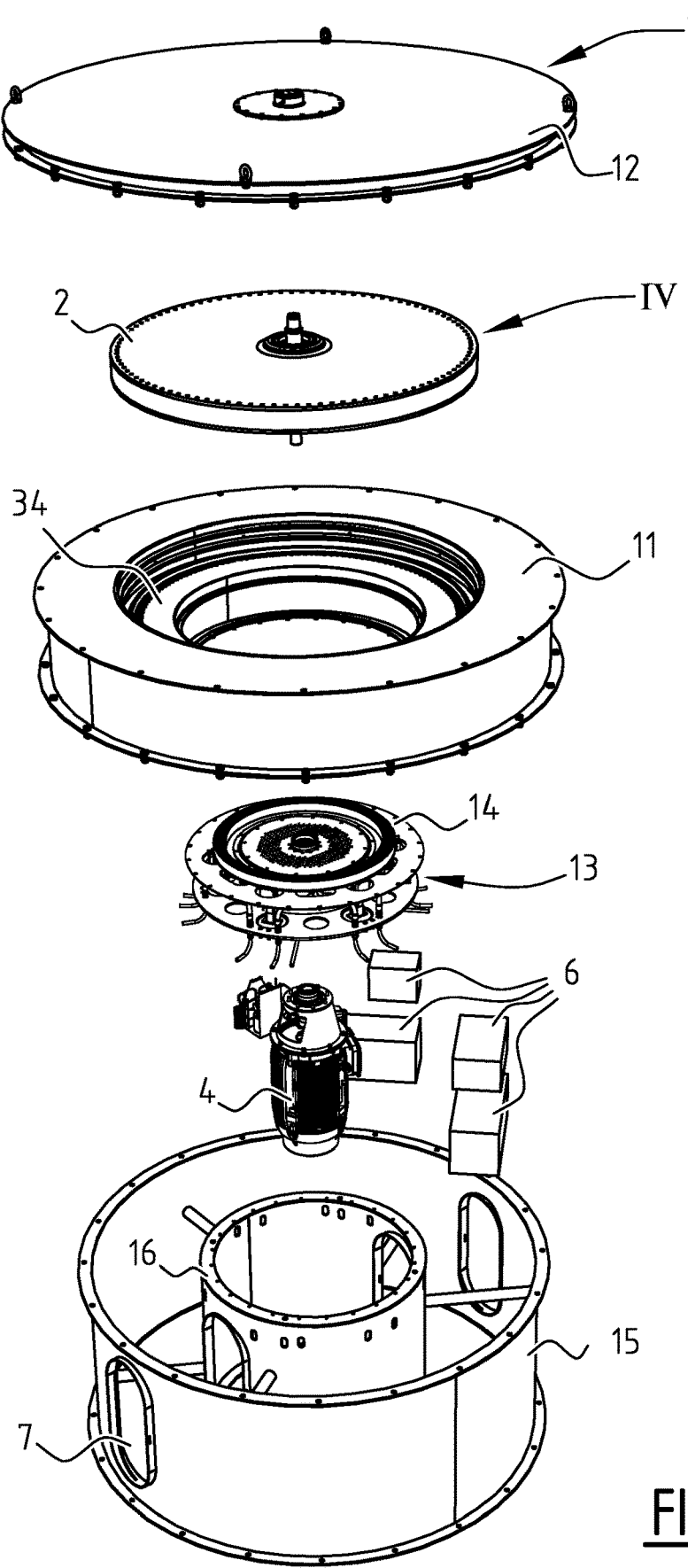
FIG. 2 is an exploded view of the flywheel system seen in FIG. 1.

FIG. 2 exhibits an exploded view of the flywheel system 1 according to FIG. 1. Therein, housing 5 is again exhibited to accommodate pumps 6 and the flywheel rotor 2 in a lower casing 15, at least. The lower casing 15 also comprises a cylindrical accommodation 16, essentially for the drive/generator 4. In the present embodiment, housing 5 also incorporates a top casing 11 to more closely accommodate flywheel rotor 2, over which a lid 12 may be arranged onto top casing 11. In the perspective view of FIG. 2, top casing 11 evidently exhibits a ring shape, where a central opening thereof serves to accommodate a carrier construction 13, comprising an air ring 14. Carrier construction 13 also serves to attach the drive/generator 4 to the drive shaft 3, which is also connected to flywheel rotor 2.

Figure 3:
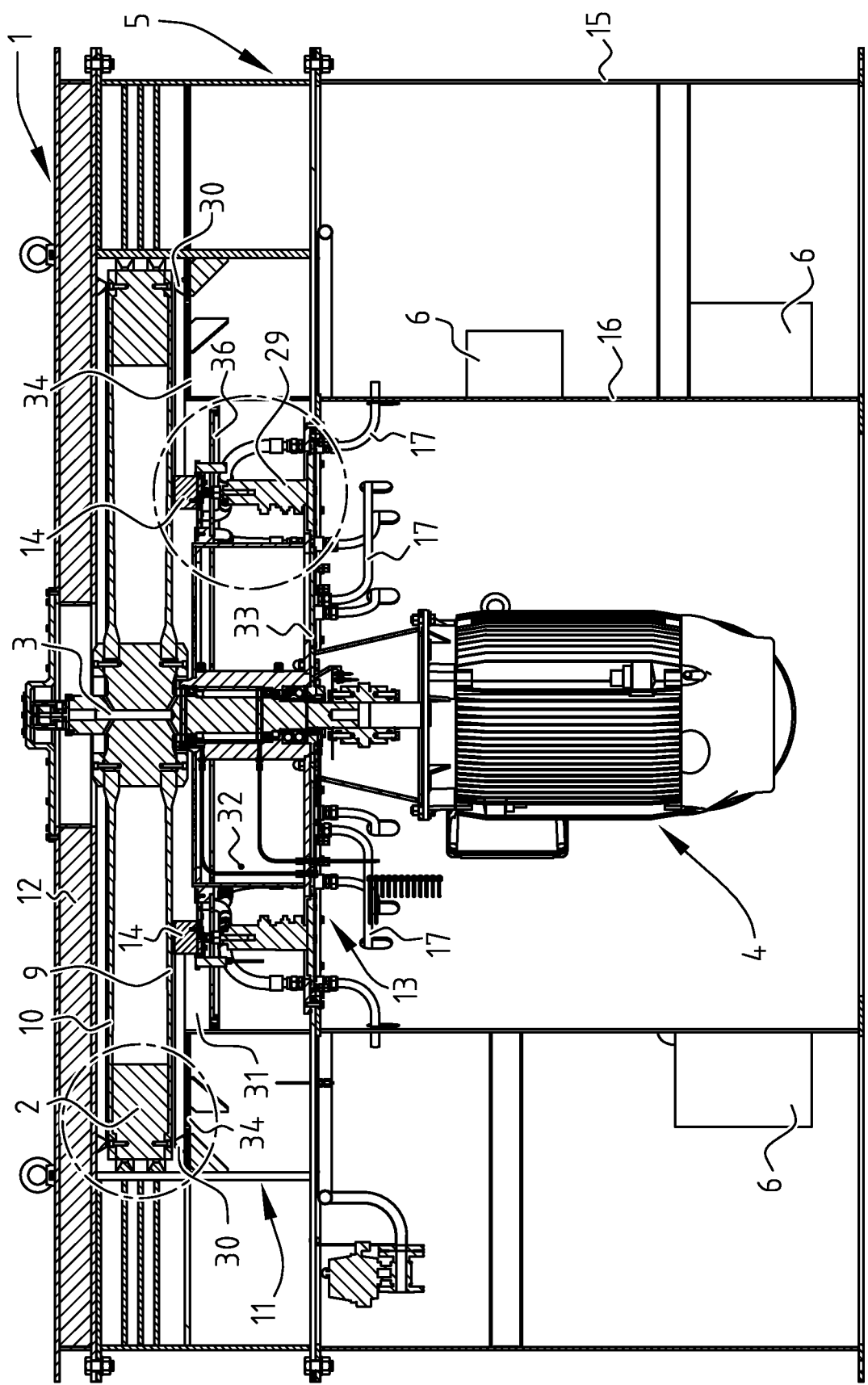
FIG. 3 is a cross-sectional side view of the flywheel system seen in FIG. 1.

FIG. 3 exhibits a cross sectional view along line in FIG. 1 and shows even more detail of the flywheel system 1 in an assembled state, such as for instance conduits 17, which are connected (not shown) to selected ones of the pumps 6, in correspondence with locations of associated evacuation connections (described in more detail below), where air is to be evacuated from the immediate surroundings of flywheel 2. It is again noted here that air levitation and all features associated therewith are optional with respect to the present disclosure.

Figure 5:
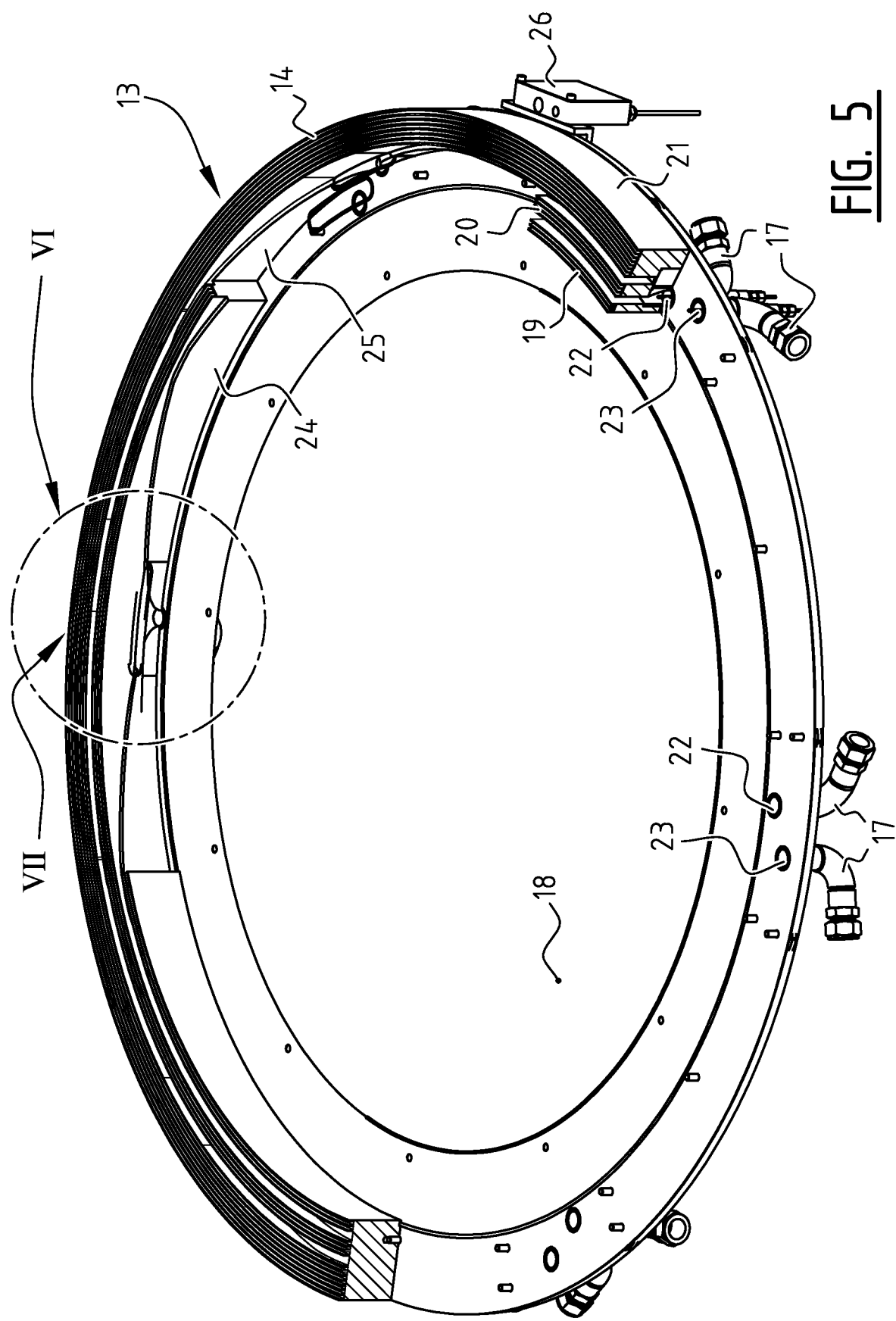
FIG. 5 is a perspective view of the carrier construction seen in FIGS. 2 and 3.
Figure 6:
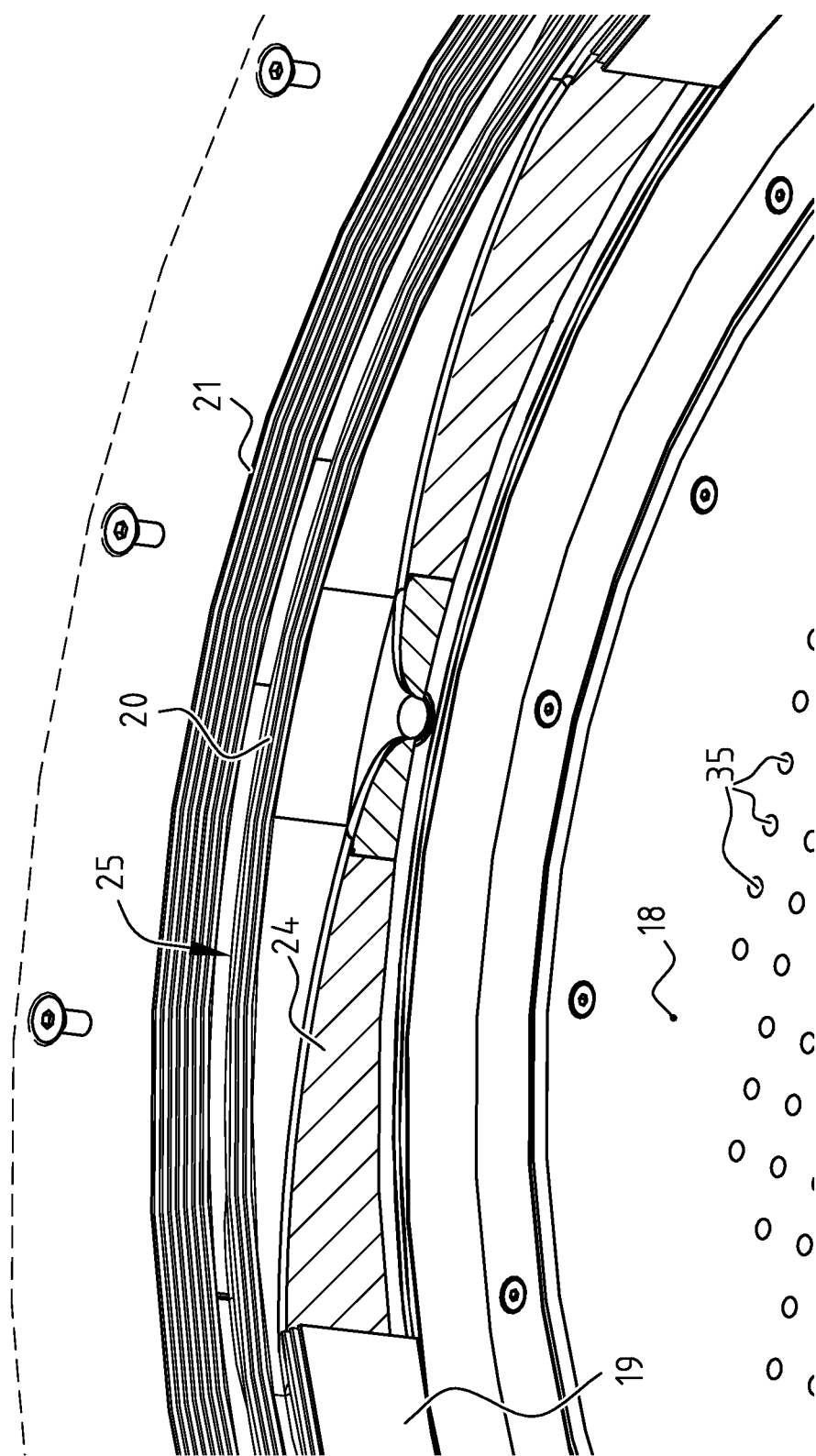
FIG. 6 is a magnified view of a portion of the carrier construction seen in FIG. 5.

FIG. 5 exhibits a perspective view of the carrier construction 13 of FIGS. 2 and 3. Carrier construction 13 comprises a base plate 18 which can form a part of the assembly of housing 5, or can be at least attached thereto. Simultaneously or alternatively, the base plate 18 may form a part of the carrier construction 13 itself. FIG. 5 also shows in more detail the air ring 14, which comprises several concentric air ring elements 19, 20 and 21. The top faces of the individual ring elements may be designed specifically to create as much drag in air as possible, in case of an emergency stop, when air can be let into the chamber under such circumstances, in order to slow down the passing air stream. For instance, profiles may be arranged in or on the top faces. Additionally or alternatively, such air brakes may be extendable, in particular in a non-vacuum chamber, to provide as little drag as possible during normal operation. Evacuation connections 22 between the innermost ring element 19 and the central ring element 20 are connected to selected ones of the conduits 17, and evacuation connections 23 between the central ring element 20 and the outer ring element 21 are connected to selected ones of the remaining conduits 17, as shown also in the top view of FIG. 7. Further, the filling elements 24 are provided between the innermost ring element 19 and the central ring element 20 and filling elements 25 are provided between central ring element 20 and outermost ring element 21. Thereby, the efficiency of air of the evacuation from the space between the concentric ring elements 19-21 is optimised, where the filling elements 24, 25 exhibit a curvature of the upper edge thereof, downward towards evacuation connections 22, 23 and a upwards towards an upper region of the concentric ring elements 19-21, as shown in FIG. 6, to minimise open spaces between the concentric ring elements 19-21 and consequently to minimise the amount of air to be evacuated from such an open space and optimise efficiency of evacuation of air. The filling elements may be made from metal, or any other convenient or suitable material. It is further noted that a 3D printed insert 40 may be applied close to evacuation connections 22, to provide a very well predefined curvature of the assembled filling elements 24, 25, 40 to promote discharge of air as efficiently as possible, due to the fact that the ideal pipe diameter to transport [air/gas] from the evacuation connection to the pumps does not fit the top face of the air ring.

Figure 10:
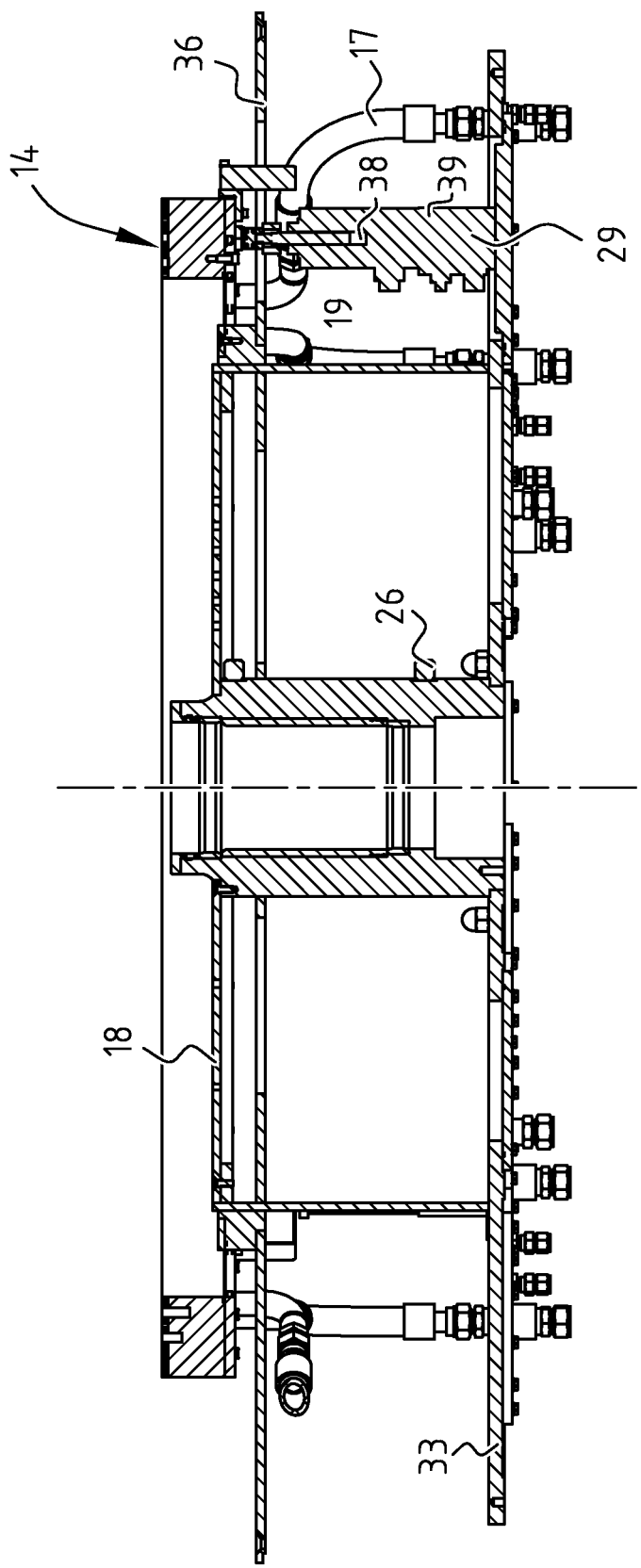
FIG. 10 is a side cross-sectional view of the assembly of the carrier construction seen in FIG. 9.

Distance sensors 26 may be provided on base plate 18 or in contact even with anyone of the ring elements 19-21, for example the outermost ring element 21. Also, as shown in FIG. 10, vibration sensors may be provided on or against a drive shaft, or anywhere else in the flywheel system 1. The function thereof could be to detect unwanted vibrations, which could become detrimental to the flywheel system, especially in view of the high mass of flywheel rotor 2 itself. A controller (not shown) may receive measuring signals from the distance detectors 26 or vibration detectors to regulate a rotational speed of flywheel rotor 2, for instance if vibrations occur at a specific rotational speed of flywheel 2, which could approximate an eigen-frequency, wherein the system could start to resonate.

Figure 8:
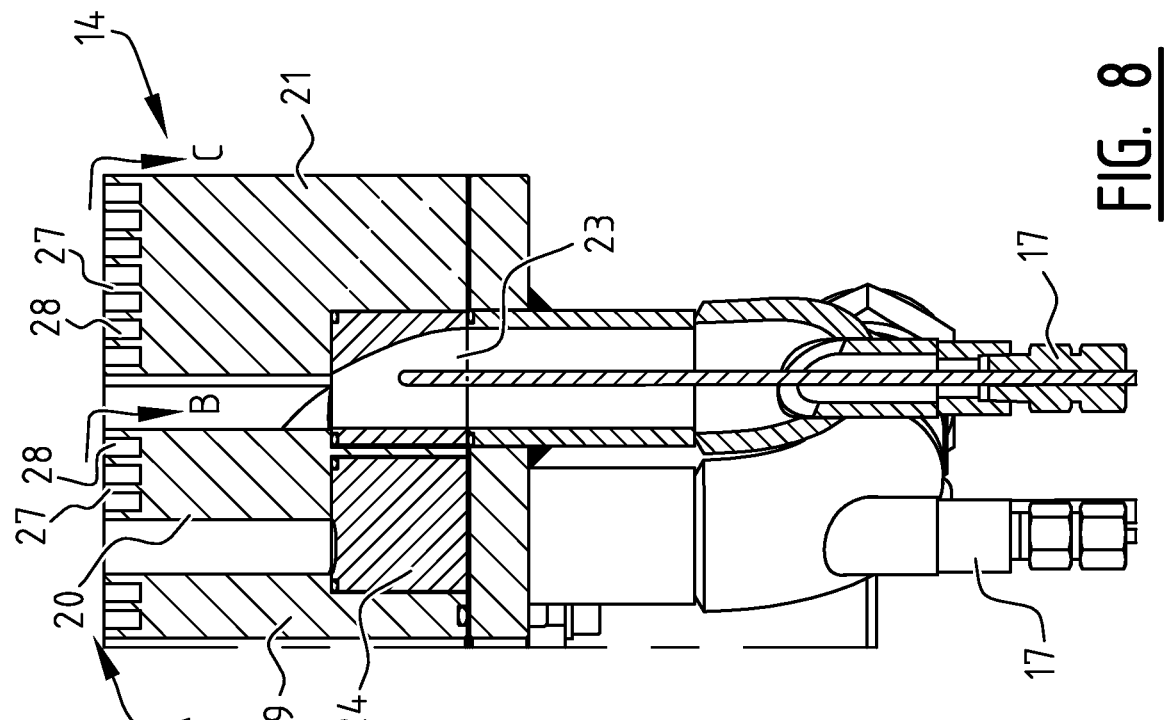
FIG. 8 is a cross-sectional view the carrier construction taken along line VIII-VIII seen in FIG. 7.
Figure 7:
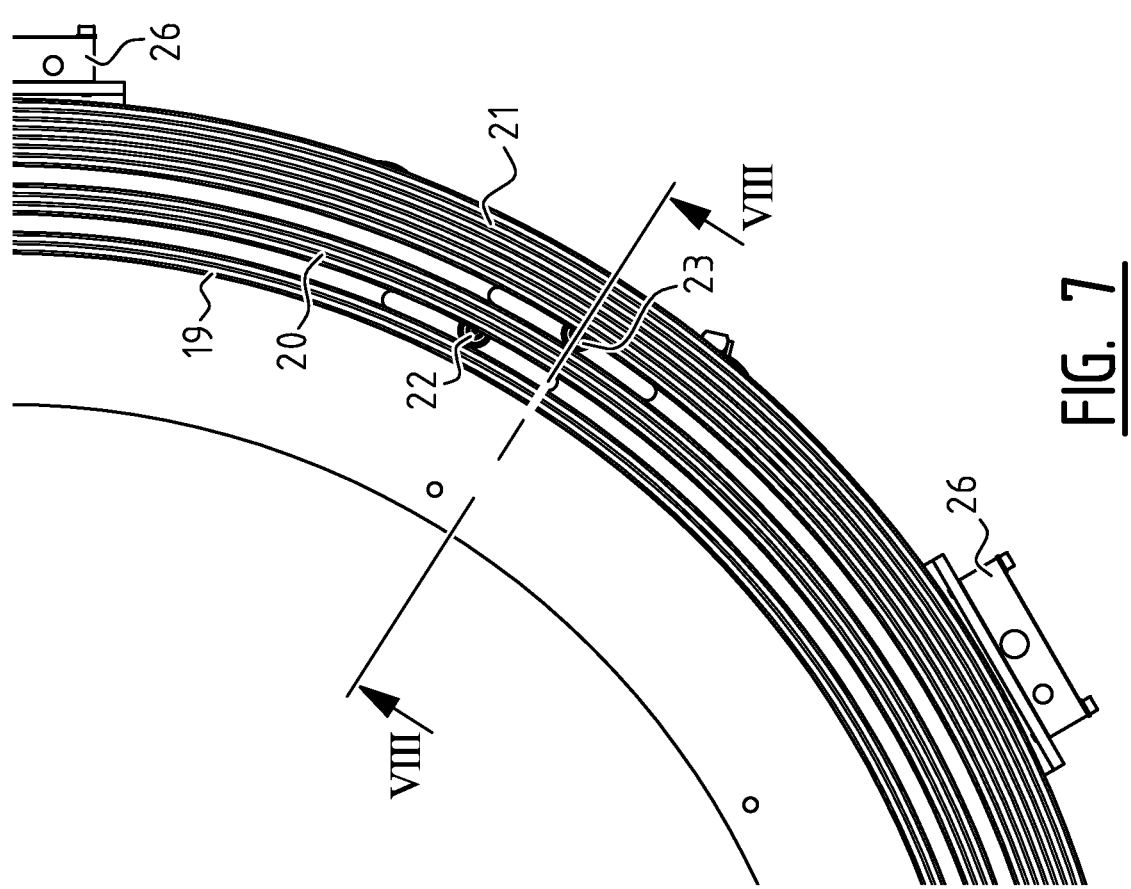
FIG. 7 is a magnified top down view of the carrier construction taken along arrow VII seen in FIG. 5.

FIG. 8 depicts a cross-sectional view along line VIII-VIII in FIG. 7, which in itself is a top view in the direction of arrow VII in FIG. 5. Therein, it is shown that each of the ring elements 19-21 has a top, consisting of protrusions 27 and depressions 28, in the concentric shapes, which are concentrically arranged in relation to the drive shaft 3. Air, that is drawn out of the space between the innermost ring element 19 and the central ring element 20, via evacuation connections 22, conduits 17 and relevant associated pumps 6, is drawn in the direction of arrow A in FIG. 8 over the innermost ring element 19. Air, that is drawn out of the space between the centre ring element 20 and the outermost ring element 21, via evacuation connections 23, conduits 17 and relevant associated pumps 6, is drawn in the direction of arrow A in FIG. 8 over the centre ring element 20. As shown in for instance FIG. 3, flywheel 2 is arranged immediately on top of, but not in contact with air ring 14. A distance between air ring 14 and flywheel 2 may be so small, that a gap therebetween can measure for instance only 50 μm. Preferably, an air gap between air ring 14 and flywheel rotor 2 could even be less than 50 μm, more embodiments of the present disclosure could also function with a larger air gap. Depressions 28 relative to a top surface of the air ring 14 serve to capture some of the air, that is drawn over of the innermost or centre ring elements 19, 20. These air pockets and the flows of air in the direction of arrows A and B, enable the flywheel rotor 2 to be air elevated, at the mentioned short distance above air ring 14.

Outside of the air ring 14, pumps 6 may also be connected to a space 31 in FIG. 3, to draw a flow of air in the direction of arrow C in FIG. 8. Pumps 6 may also be connected to conduits 17 to evacuate the interior of space 32 in FIG. 3 underneath flywheel rotor 2 through holes 35 in base plate 18, as depicted in FIG. 6, and in the vicinity of shaft 3. Then, a relatively air pressure in the chamber or space 32 should be kept at the higher pressure, even if below atmospheric, then an air pressure in chamber or space 31, in order to allow air to be drawn in flows from the interior space 32 over the air ring 14. For instance, a pressure within space 32 may be in the vicinity of 300 to 350 mb, where space 31 is evacuated to a value of approximately 1 mb or the like.

Above, it has been noted that cover elements 9, 10 and the flywheel rotor 2 may bend down in rest or at low rotational velocities, even though bending is to be avoided as much as possible, especially in a non-rotating state. Consequently, flywheel 2 may come to rest on air ring 14, which is an undesirable situation. From such a nonrotating state, with contact between flywheel rotor 2 and a ring 14, in particular a very heavy flywheel cannot be set into rotational motion. When flywheel rotor 2 has reached an operational rotation speed, centrifugal forces will straighten the cover elements 9, 10 and flywheel rotor 2, but such an operational rotational state needs to be accomplished first. To address this issue, to particular features are incorporated into the embodiment, as depicted in for instance FIG. 3.

As a first measure, air ring 14 is arranged on an elevator configuration 29, for instance consisting of cylinders, which could be hydraulic oil or pneumatical. The elevator configuration 29 can raise or lower the air ring 14 relative to housing 5, to adapt a position of air ring 14 in relation to a bent state of the cover elements 9, 10 and/or the heavy flywheel rotor 2 by lowering the air ring 14, when flywheel rotor 2 is stationary or rotating at a low speed, or in relation to a straightened state of the cover elements 9, 10 and/or of the heavy flywheel rotor 2 by raising the air ring 14. Thereby, under all circumstances, a gap between inner ring 14 and flywheel 2 can be maintained. Distance detectors 26 referred to above may serve to determine a size of such a gap, and a control may drive the elevator configuration 29, to maintain a constant gap size between the air ring 14 and the flywheel 2 of for instance 50 μm. It should be noted that the air ring 14 is in the currently disclosed embodiments neither designed nor intended to raise actively the flywheel to a straightened position of the cover elements 9, 10, and that such straightening is achieved automatically, when an operational speed of the flywheel 2 is achieved, due to centrifugal forces. However, the air ring 14 could, in an alternative embodiment, be used actively to raise the flywheel 2.

Further, as the second measure, glide bearings 30 can be provided on top of inside upper surface of top casing 11, as shown also in FIG. 3, to support lower cover element 9 and/or flywheel rotor 2 in a stationary state or when rotating at lower speeds. Such glide bearings 30 also facilitate setting flywheel rotor 2 into motion, for instance using a drive function of drive/generator 4. Contact between lower cover element 9 and/or flywheel rotor 2 on the one hand and glide bearings 30 on the other hand will diminish and disappear, as rotational speed of flywheel rotor 2 increases and before it reaches an operational rotational speed, as a consequence of the straightening effect on cover elements 9, 10 and/or flywheel rotor 2, due to centrifugal forces.

Figure 9:
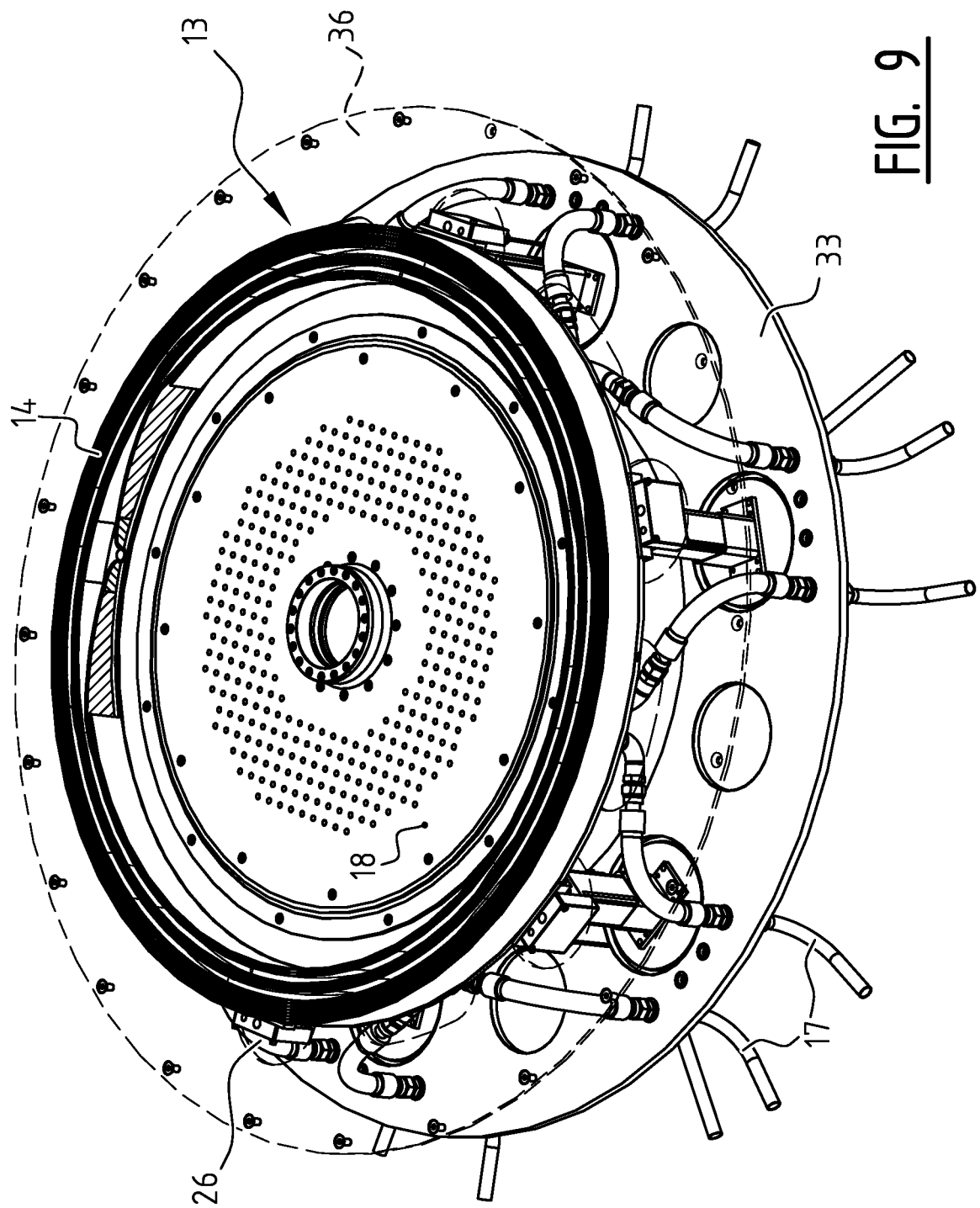
FIG. 9 is a perspective view of an assembly of the carrier construction seen in FIG. 3 having an air ring on top thereof.

FIG. 9 exhibits in perspective view, and FIG. 10 exhibits in a side cross sectional view an assembly of carrier construction 13, having air ring 14 on top thereof, with a first mounting plate 33 and a second mounting plate 36, which are also represented in FIG. 3. This assembly of carrier construction 13 with mounting plate 33, on which the carrier construction is configured and allows for assembly of the conduits 17 and the like, is arranged in the central passage of the ring shaped top casing 11, where flywheel rotor 2 is arranged also in said central passage, but on the inner top surface 34 of top casing 11, that has been referred to above as well. More in particular, as described above, flywheel rotor 2 does not rest on said in a top surface 34 or even on air ring 14. As a consequence it may be considered that a carrier construction 13 does not actually carry the weight of flywheel rotor 2, but that flywheel rotor 2 is air elevated over air ring 14 at a very short distance above air ring 14. Nonetheless, carrier construction 13 does in fact carry the drive/generator 4.

FIG. 10 further shows in more detail a configuration of the elevator configuration, comprising a piston 37 in a bore 38 of a support post 39. By extending piston 37 from bore 38, air ring 14 is raised.

It should be self evident to the skilled reader that the above described embodiment is not the only one possible within the bounds and limitations of the scope of protection for embodiments of the present disclosure according to the appended claims. For instance, air levitation may be omitted. The flywheel rotor 2 can be massive or solid, but should be ring shaped having an open centre, to maximise concentration of weight at a distance from the rotation axis. The flywheel 2 and the cover elements 9, 10 may form an integrated unit or assembly. Dimensions of the flywheel rotor and of the associated cover elements forming connection elements can vary, as well as operational speeds and pressure values, relative to those disclosed herein above. A number of pumps and conduits can be minimised relative to embodiments described, shown and disclosed herein. The configuration of a top casing can be omitted, depending on a structure of the housing. Other alterations and adaptations can also be contemplated, and will lie within the borders and boundaries of the scope of protection defined to the appended claims, unless such additional and/or alternative embodiments deviate from the unitary inventive concept underlying the specifically defined features of the claims.

The invention claimed is:

1. A flywheel system, comprising:
a drive shaft disposed coaxially with a rotation axis of the flywheel system having a hub portion being disposed coaxially with the rotation axis of the flywheel system;
a ring-shaped flywheel rotor;
at least one connection element coupled to the ring shaped flywheel rotor and to the hub portion;
a drive and/or a power generator coupled to the drive shaft;
wherein the flywheel rotor has
an outer radius in radial direction of at least 0.85 meter,
a thickness in axial direction of at least 0.30 meter, and
a weight of at least 2.5 tons,
wherein the at least one connection element is disk shaped, extends from the hub portion over at least a portion of a first axial end surface of the ring shaped flywheel rotor, and is configured to engage the first axial end surface of the flywheel rotor at an outer circumference thereof to reduce expansion and/or deformation of the ring-shaped flywheel rotor and/or a lateral force acting thereon,
wherein the disk shaped connection element is fixed to the hub portion, whereby the ring-shaped flywheel rotor, the hub portion, and the drive shaft rotate together about the rotation axis to transmit rotational movement of the ring-shaped flywheel rotor to the drive and/or power generator or vice versa,
wherein the disk-shaped connection element is directly coupled to the hub portion through a uniform radial clamping force provided between the connection element and the hub portion by a shrink-fit connection so that a centrifugal force generated by the ring-shaped flywheel rotor is distributed evenly over the hub portion, and
wherein the shrink-fit connection is configured to pre-stress the connection element and reduce a stress applied to the connection element by the centrifugal force generated by the ring-shaped flywheel rotor.

2. The flywheel system according to claim 1, wherein the drive and/or the power generator is, in use of the flywheel system, arranged to allow rotation of the flywheel rotor at a speed of between at least 600 rpm and 1800 rpm.

3. The flywheel system according to claim 1, wherein the flywheel rotor has an inner radius in radial direction of at least 0.75 meter.

4. The flywheel system according to claim 1, wherein at least one additional connection element is arranged between an axially opposing axial end of the flywheel rotor directly and the hub forming the rotation axis.

5. The flywheel system according to claim 4, wherein the additional connection element is disk shaped.

6. The flywheel system according to claim 5, wherein the disk shaped connection element is flexible to support the ring shaped flywheel rotor.

7. The flywheel system according to claim 1, wherein the disk shaped connection element and/or additional connection element is thicker at the hub disposed coaxially with the rotation axis of the flywheel system than at the ring shaped flywheel rotor.

8. The flywheel system according to claim 7, wherein the thickness at the drive shaft disposed coaxially with the rotation axis of the flywheel system is more than 13 mm.

9. The flywheel system according to claim 7, wherein the thickness at the ring shaped flywheel rotor is less than 19 mm.

10. The flywheel system according to claim 1, wherein the hub is cooled prior to assembly with the least one connection element, and the at least one connection element is heated prior to assembly with the hub.

11. The flywheel system according to claim 10, wherein an accommodation in the at least one connection element for the hub is in a state of equal temperature with the hub and wherein the accommodation in the at least one connection element is smaller than an over-dimensioned portion of the hub.

12. The flywheel system according to claim 11, wherein the hub is over-dimensioned by between 0.6 and 1.2 mm relative to the accommodation, to allow for expansion of the at least one connection element by 0.35 mm at a rotational speed of the assembly of the ring shaped flywheel rotor and the at least one connection element of no more than 1800 rpm.

* * * * *